May 23, 1967 W. D. LUSEBRINK 3,320,920
LIGHT REFLECTING VEHICLE MOUNTED SPOTTING SIGNAL
Filed March 25, 1966 2 Sheets-Sheet 1

Walter D. Lusebrink
INVENTOR.

BY Clarence A. O'Brien
and Harvey B. Jacobson
Attorneys

May 23, 1967 W. D. LUSEBRINK 3,320,920
LIGHT REFLECTING VEHICLE MOUNTED SPOTTING SIGNAL
Filed March 25, 1966 2 Sheets-Sheet 2
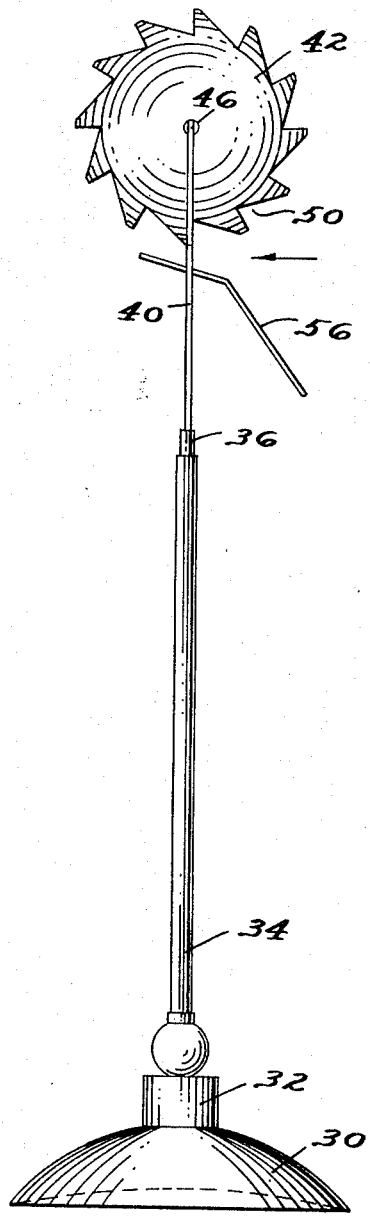
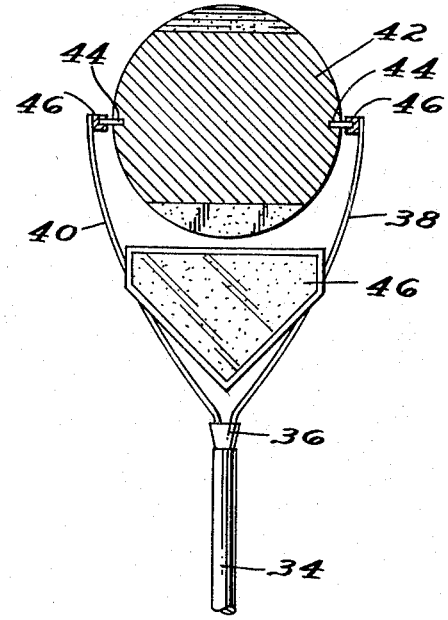
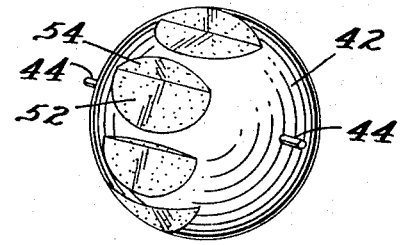
INVENTOR
WALTER D. LUSEBRINK
BY
Barnes, Kisselle, Raisch & Choate
ATTORNEYS

United States Patent Office 3,320,920
Patented May 23, 1967

3,320,920
LIGHT REFLECTING VEHICLE MOUNTED
SPOTTING SIGNAL
Walter D. Lusebrink, 20024 Edmunton Drive,
St. Clair Shores, Mich. 48080
Filed Mar. 25, 1966, Ser. No. 543,451
5 Claims. (Cl. 116—28)

This application is a continuation-in-part of my copending application Ser. No. 491,575, filed Sept. 30, 1965, now abandoned.

This invention relates to an automotive accessory, more particularly, an easy-to-see quick-spotting position designating indicator which marks the spot of an automobile or equivalent vehicle which the latter is either moving or standing still, both night and day.

This invention is deemed to be unique in that it is purely mechanical and, despite its unusual simplicity, promotes safety in street and highway traffic and/or helps one spot a car (his own or another car) on a huge and heavily crowded parking lot at a baseball or football game, while following another car (or cars) of a family group on a highway trip to the beach or elsewhere, and which lends itself to other miscellaneous marking and identification uses during an organized parade or similar procession where single or collective identification is necessary to minimize confusion.

It is realized that vehicle identifying markers of many and varied forms are known and in use. However, and by contrast, the adaptation herein disclosed is an innovation in that it is simple, practical, economical, can be applied and used at will, and is suitable for its intended purposes in that it uses an elevated target, a ball-type indicator head, whose vivid color can be selected (can be iridescent and otherwise glowing and colorful), but, and this is most important, the entire surface is covered or coated with luminous light reflecting material, whereby when a car ahead swoops down over a hill or sweeps through a dip in the freeway at night, the indicator serves as a reliable light reflecting tell-tale target and visually assists in safer driving than would otherwise be the case for cars when cautiously following another. Then, too, cars equipped with this simple "spotter" and approaching in an oncoming lane are capable of being seen coming up over a hill or otherwise ascending and descending with the result that all concerned are better prepared for difficult after-dark driving hazards. It follows that this innovation supplements disappearing brake lights, taillights, headlights and turning and other signalling means.

It is a further object of the invention to provide an identification device which is responsive to the air movement as the car is in motion so that the device is rotated by such movement. Thus, a multiple colored device can, when rotated, have a color blend which is different from the stationary colors and it is also possible to have reflective surfaces in conjunction with the vane configuration of the rotating device which will be visible both forward and aft of the vehicle and insure attention.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 4 is a view of a modified device adapted to rotate with wind motion.

FIG. 5 is a sectional view of the device illustrating the construction.

FIG. 6 is a perspective view of the rotating ball showing the vane configuration.

Figure 1:
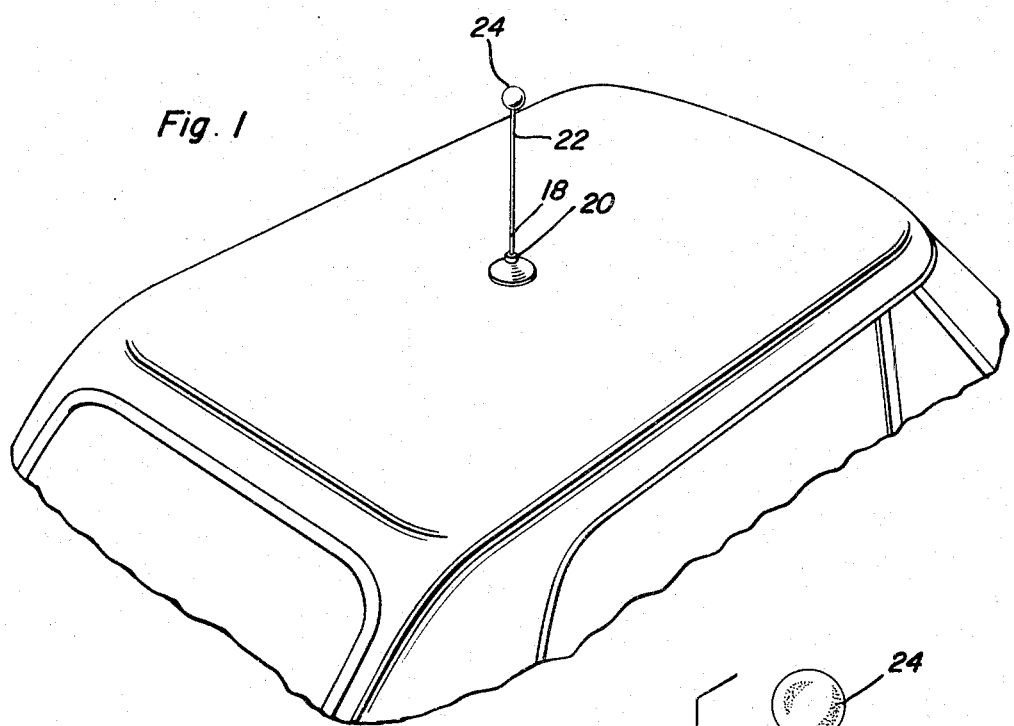
FIG. 1 is a view showing the improved light reflecting multi-purpose spotting indicator and signal in perspective and mounted for use atop the central area of the vehicle roof in readiness for use.
Figure 2:
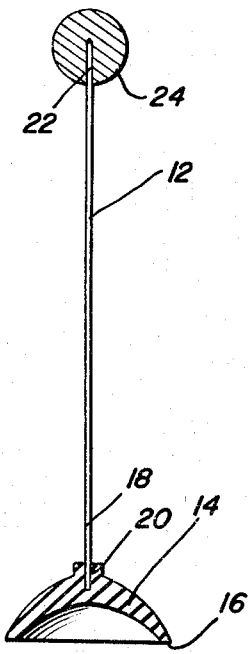
FIG. 2 is a view of the indicator by itself showing the suction cup and indicator ball in section.
Figure 3:
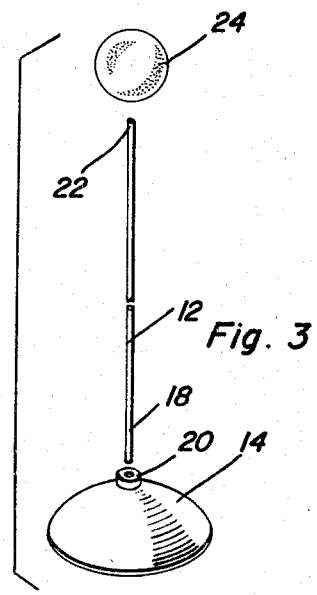
FIG. 3 is an exploded perspective view of the invention.

The invention is of the utmost in structural simplicity and is accordingly characterized by a mount, a shaft and an indicator head. The shaft comprises a wire or steel rod which in practice is usually twelve inches high, the rod being denoted by the numeral 12. The holddown and mounting means comprises a suitable rubber or equivalent suction cup 14 whose bottom edge 16 is adapted to be temporarily applied to the central region or area of the crest of the roof of the vehicle whether it be a truck cab, bus or automobile. The bottom edge 16 can, if desired, be provided with a film of adhesive media to guard against displacement. The lower end portion 18 of the shaft is anchored in the reinforced neck or crown portion 20 on the domical surface of the suction cup. By using an upstanding shaft or minimal cross-sectional dimension the shaft can, if needs be, flex and impart a slight swaying movement to the indicator head which is preferably in the form of a ball or sphere for effective results. The upper end portion 22 of the shaft 18 is fitted and anchored in a socket provided therefor in the indicator head 24. In practice, the ball or head may well be as large, or slightly larger than a golf ball. The head will vary in color in keeping with the particular service to be performed. This is to say, the head can be made from moldable plastic material and can be of a given solid color or variegated and, if desired, iridescent. In addition to this color code aspect, the entire surface of the head is to be coated or covered with light reflecting material (not detailed) as denoted generally at 24.

It is preferred that the shaft 12 be of a flexible nature and well anchored in the suction cup 14 so that it will not vibrate loose. This can be accomplished by a reasonably deep socket hole in the top portion of the suction cup and any standard anchoring means.

As above pointed out, it is preferable that the rod 12 be slightly flexible with wind force and with this arrangement it has been found that the ball 10 will not only flex backwardly by wind force but will, in seeking stability, move in a circular fashion, sometimes in a random manner and sometimes in a regular manner to create more motion and thus insure attention. This is particularly important when vehicles are coming over a rise in a rod and especially for low slung vehicles of the modern design.

In FIGURE 4, a modified structure is shown in which a suction cup 30 is provided to anchor on the horizontal surface of a vehicle, the suction cup having a socket head 32 for the deep recessing of a flexible shaft 34 which terminates in a Y-bracket 36 having arms 38 and 40. Between the distal ends of the arms 38 and 40 is mounted a spherical object or ball 42 there being diametrically opposed pins 44 anchored in the ball in polar relation thereto which are mounted in small opposed bearings 46 at the end of the arms. As shown best in FIGURES 4 and 6, the ball 42, which can be formed of plastic, for example, polystyrene, is provided with notches 50 which are generally L-shaped in cross section to provide surfaces 52 and 54, the surfaces 54 being shorter than the surfaces 52.

The surfaces 52, in general, lie in a plane parallel to the axis of the ball in a plane tangential to a circle passing through the base of said notches 50 and having an axis coincident with the rotational axis of the object 42. The surfaces 54 are substantially radial of the ball. It is desirable that these surfaces be coated with a reflective material which can be created by a foil or by colored beads which are adhered to the surfaces by a suitable adhesive or paint. The ball itself can have a double color such as yellow and red which in rotation will turn out to be orange. Any combination of colors can be used. The reflective surfaces 52 and 54 will reflect the lights of an oncoming car whether from the rear or from the front and thus enhance the value of the device at night. The reflective characteristics can be increased by mounting a small panel 56 between the arms 38 and 40, this panel being covered with a reflective coil to increase the amount of light which is striking the surfaces 52 and 54 of the ball. The ball may also be hollow and translucent to contain a self-illuminating perpetual glowing gas such as Krypton. This panel 56 also feeds the oncoming air of a vehicle into a venturi passage weherein the increased velocity will increase the speed of rotation of the ball.

With this colorful easy-to-spot head perched atop the standard, it can be spotted readily during daylight usage and will function effectively to reflect either natural light or artificial light in a manner similar to highway reflectors and road marking safety indicators.

The embodiments of FIGURES 4 to 6 also add to the value of the device as an eye-catching novelty and makes it particularly useful at night when the reflective surfaces of the rotating ball will create a striking effect as the device is approached by another vehicle with headlights shining on it.

It is believed that a careful consideration of the disclosure will enable the reader to fully understand the construction and manner of use and the features and advantages attainable therefrom. Accordingly, a more extended description is thought to be unnecessary.

The foregoing is considered as illustrative only of the principles of the invention. Further, since numerous modifications and changes will readily occur to those skilled in the art, it is not desired to limit the invention to the exact construction and operation shown and descibed, and accordingly all suitable modifications and equivalents may be restored to, falling within the scope of the invention as claimed.

What is claimed as new is as follows:

1. An identification and warning device for use on moving and stationary vehicles of the type having a mount such as a suction cup for attachment to a surface, that improvement which comprises:
   (a) a flexible shaft affixed at one end to said mount,
   (b) an attention attracting indicator in the form of a spherical object attached to the top of said shaft having a surface covered with an attention attracting color whereby when said vehicle is stationary, said spherical object will be stationary and when said vehicle is moving, said spherical object will aerodynamically create a flexing motion of said shaft to cause a random swaying motion of said spherical object, thereby increasing its effectiveness as an indicator,
   (c) said spherical object being mounted for rotation on a diameter between a pair of poles of said sphere and the equatorial surface of said sphere between the poles being provided with a plurality of circumferentially spaced notches shaped to impart a wind wheel motion to said object when a vehicle carrying said device is in motion whereby to rotate said spherical object and increase its effectiveness as an indicator.

2. A device as defined in claim 1 in which the surfaces of said notches are coated with light reflecting material to increase the effectiveness of said device at night.

3. An identification and warning device for use on moving and stationary vehicles of the type having a mount such as a suction cup for attachment to a surface, that improvement which comprises:
   (a) a shaft anchored in said mount having a bifurcate portion at its upper end separating into spaced arms,
   (b) opposed bearing means on each of said arms,
   (c) a spherical object adapted to be mounted on said arms,
   (d) means mounted on diametrically opposed poles of said spherical object to cooperate with said opposed bearings to mount said object for rotation between said arms, and
   (e) said spherical object being provided with notches equatorially positioned between said poles and shaped to have one substantially radial wall and another relatively longer wall positioned in a plane substantially parallel to the axis of the spherical object and substantially tangential to a circle passing through the base of said notches with an axis coincident to the polar axis of said spherical object.

4. A device as defined in claim 3 in which an air funnelling device is mounted adjacent said spherical object angled to direct air to a narrowed space adjacent said object to create a venturi effect to increase the rotational effect of air moving past said object.

5. A device as defined in claim 4 in which one or more walls of said notches and the exposed surface of said air funnelling device are coated with a reflective material to increase the effectiveness of said device as a visible indicator at night.

References Cited by the Examiner

UNITED STATES PATENTS

| 1,435,106 | 11/1922 | Comiskey | 40—37.1 |
|---|---|---|---|
| 1,600,450 | 9/1926 | Aronson | 40—39 |
| 1,645,702 | 10/1927 | Ischinger | 46—58 |
| 1,798,052 | 3/1931 | Addition | 46—58 |
| 1,852,383 | 4/1932 | Walkner | 40—39 |
| 1,877,428 | 9/1932 | Rensonnet | 116—28 |
| 2,324,614 | 7/1943 | Dalton | 116—173 |
| 2,532,835 | 12/1950 | Cohn | 46—58 |
| 2,985,976 | 5/1961 | Parker | 40—39 |
| 3,250,241 | 5/1966 | Levy et al. | 116—63 |

FOREIGN PATENTS

| 1,105,660 | 7/1955 | France. |
|---|---|---|
| 1,123,294 | 6/1956 | France. |
| 462,586 | 3/1937 | Great Britain. |

LOUIS J. CAPOZI, *Primary Examiner.*